Sept. 11, 1923.  
W. A. FIELD  
JIG SAW  
Filed June 25, 1921  
1,467,720  
3 Sheets-Sheet 1

Inventor  
William A. Field,  
By Adams & Jansen.  
Attorneys

Sept. 11, 1923.
W. A. FIELD
JIG SAW
Filed June 25, 1921  3 Sheets-Sheet 2
1,467,720
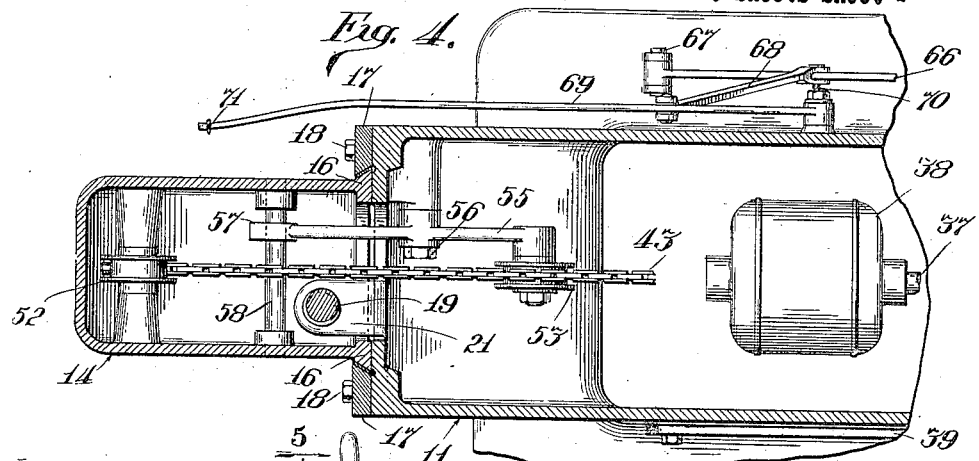
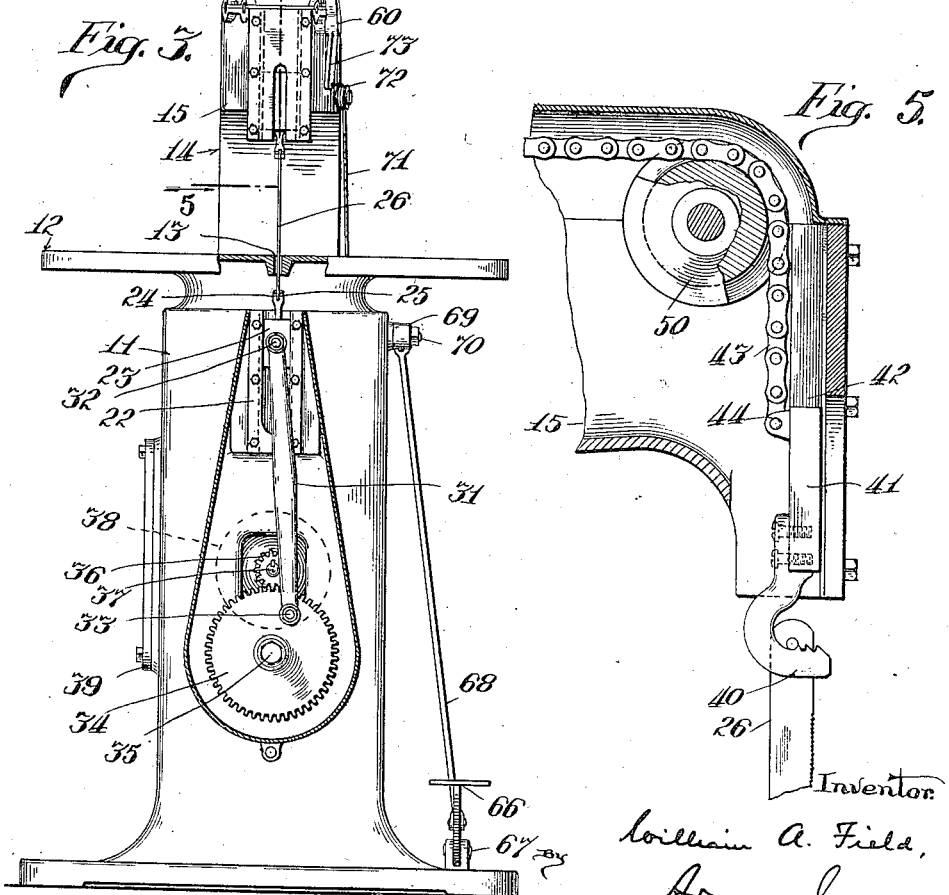
Inventor.
William A. Field,
Adams & Jameson
Attorneys Sept. 11, 1923.
W. A. FIELD
1,467,720
JIG SAW
Filed June 25, 1921   3 Sheets-Sheet 3
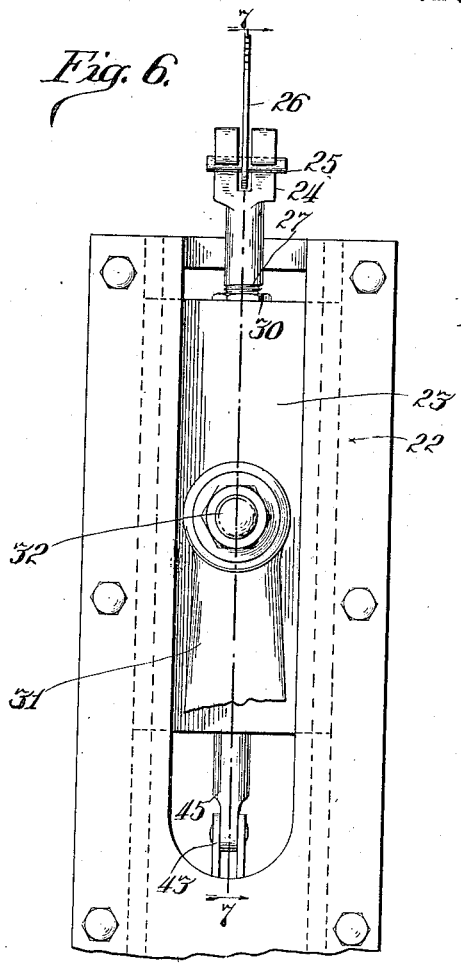
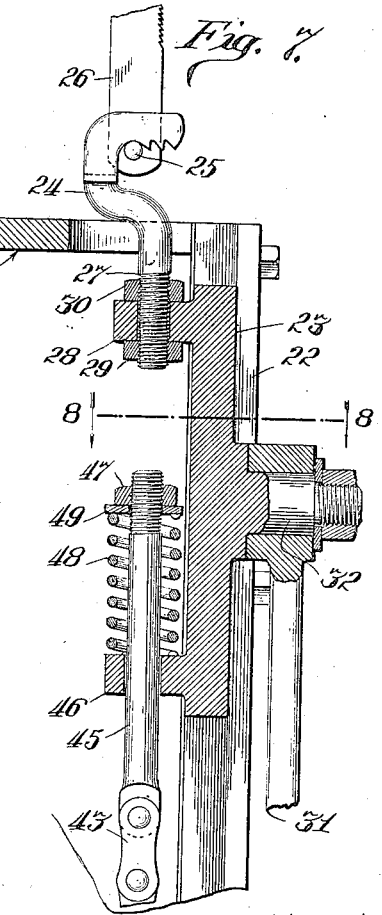
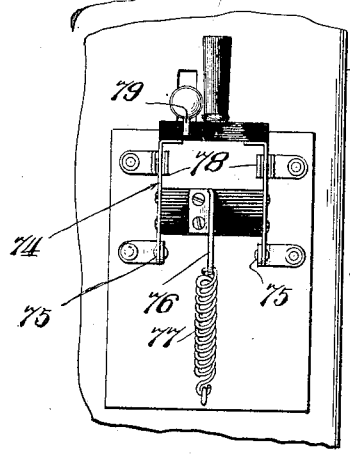
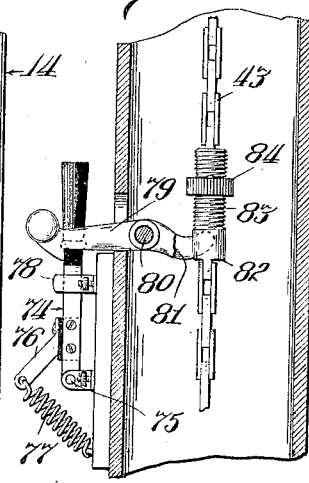
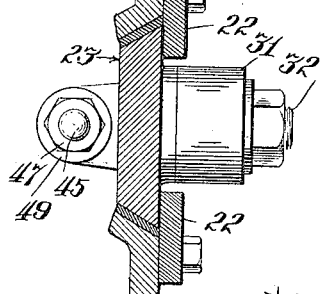
Inventor
William A. Field,
By Adams & Jackson
Attorney Patented Sept. 11, 1923.

1,467,720

UNITED STATES PATENT OFFICE.

WILLIAM A. FIELD, OF CHICAGO, ILLINOIS, ASSIGNOR TO WM. A. FIELD COMPANY, OF CHICAGO, ILLINOIS, A CORPORATION OF ILLINOIS.

JIG SAW.

Application filed June 25, 1921. Serial No. 480,321.

*To all whom it may concern:*

Be it known that I, WILLIAM A. FIELD, a citizen of the United States, and a resident of Chicago, in the county of Cook and State of Illinois, have invented certain new and useful Improvements in Jig Saws, of which the following is a specification, reference being had to the accompanying drawings.

My invention relates to jig saws and has for its objects to provide improved means for holding and actuating the saw blade so that it will always be maintained under proper tension, on the upstroke as well as on the downstroke; also to provide for readily removing and replacing the saw blades; to provide means by which the machine may readily be adjusted to accommodate saw blades of different lengths; and also to provide a power driven jig saw with means operating to stop the machine if the saw blade should break or become disconnected. I accomplish these objects as illustrated in the accompanying drawings and hereinafter described. What I regard as new is set forth in the claims.

In the accompanying drawings,—

Fig. 3 is a front view of the machine, the housing which encloses certain parts of the operating mechanism being broken away;

Fig. 4 is a horizontal section on line 4—4 of Fig. 1;

Fig. 5 is an enlarged partial vertical section on line 5—5 of Fig. 3;

Fig. 6 is an enlarged front view of the lower cross-head or slide to which the lower end of the saw blade is connected;

Fig. 7 is a vertical section on line 7—7 of Fig. 6;

Fig. 8 is a horizontal section on line 8—8 of Fig. 7;

Fig. 9 is a partial vertical section on line 9—9 of Fig. 1; and

Fig. 10 is a rear elevation of the upper portion of the machine frame showing the switch by which the operation of the motor which actuates the saw blade is controlled.

Figure 1:
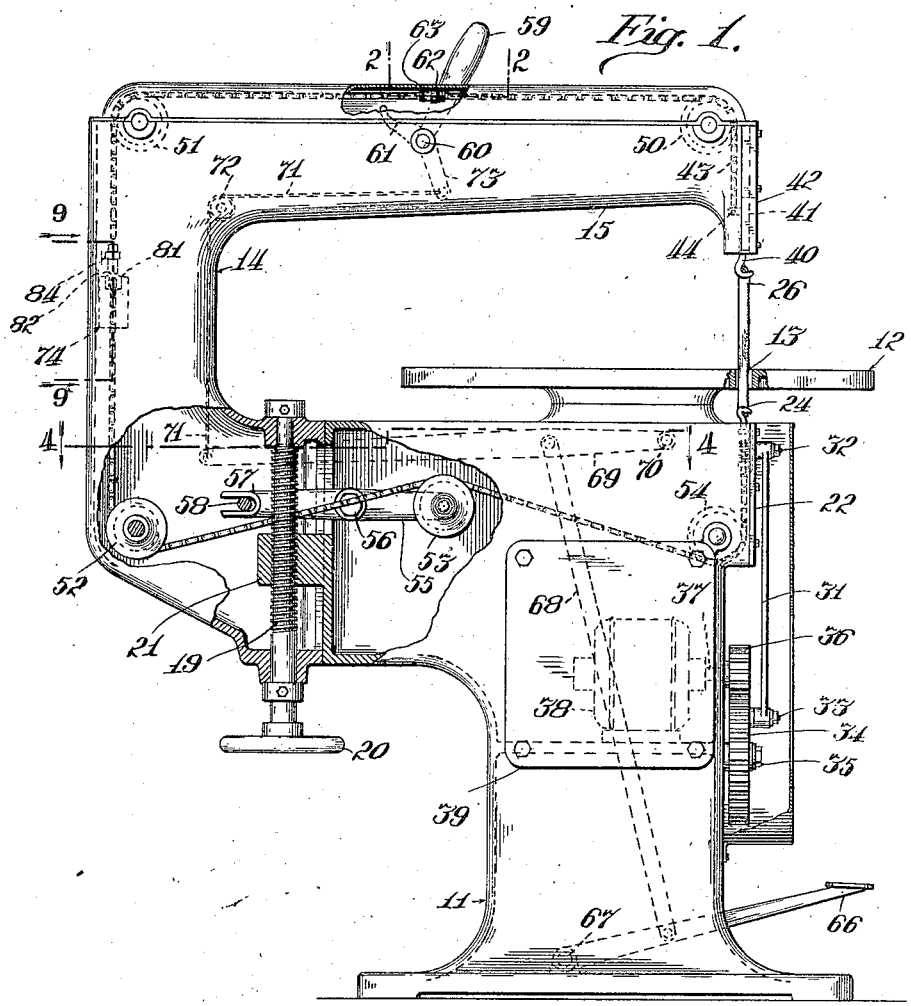
Fig. 1 is a side elevation of my improved machine, some parts being shown in section.

Referring to the drawings,—11 indicates the base or main portion of the machine frame which is of suitable size and shape to support the other parts thereof. Said base carries a table or work support 12 having a slot 13 for the passage of the saw blade, and is provided with a hollow frame or head 14 having a laterally-extending arm 15 which overlies the table 12, as shown in Fig. 1. The head 14 is vertically adjustable with reference to the base 11, and to this end it is provided with vertically-disposed laterally-projecting beveled flanges 16 which are adapted to slide in guideways provided at the back of the base, as best shown in Fig. 4. These guideways are formed by providing guide plates 17 which are secured to the base 11 by bolts 18 so that said plates may be removed when necessary. For the purpose of adjusting the head 14 vertically an adjusting screw 19 is provided, as shown in Fig. 1, equipped with a hand wheel 20, preferably at its lower end, said screw being journaled in the head 14 and operating in screw-threads formed in a boss 21 which projects from the base 11, as best shown in Figs. 1 and 4. The screw 19 does not move endwise with reference to the head 14, and it will be apparent, therefore, that by rotating said screw it will be caused to travel through the boss 21, thereby correspondingly moving the head 14.

At the front of the machine the base 11 is provided with a vertically-disposed guide 22 in which is fitted a sliding block or cross-head 23 having at its upper end a bifurcated hook 24 adapted to engage the usual cross-pin 25 carried at the lower end of a jig saw blade 26, as shown in Figs. 6 and 7. As shown in the latter figure, the hook 24 is provided with a threaded shank 27 which passes through a boss 28 projecting laterally from the cross-head 23. A nut 29 is screwed on the lower end of said shank, and a lock nut 30 is provided on said shank above the boss 28 so that the hook 24 may be firmly secured to said boss, by which construction the hook 24 may be adjusted with relation to the cross-head or may readily be removed when desired. In the operation of the machine the cross-head 23 is reciprocated vertically by means of a pitman 31, the upper end of which is connected to a wrist pin 32 carried by the cross-head, while its lower end is connected to a wrist pin 33 eccentrically carried by a gear 34 which is journaled upon a stud 35 which projects laterally from the base 11, as shown in Figs. 1 and 3. The gear 34 is driven by means of a pinion 36 mounted on the armature shaft 37 of an electric motor 38 which is preferably mounted in a suitable chamber provided for that purpose in the hollow base 11. 39 indicates a cover-plate for enclosing such chamber, as shown in Fig. 1.

The upper end of the saw blade 26 is held by a hook 40 somewhat like the hook 24, which is secured to an upper cross-head 41 mounted similarly to the cross-head 23 in a suitable guideway 42 provided for that purpose in the outer end portion of the arm 15, as best shown in Figs. 1 and 5.

When a saw blade has been applied to the machine it is held under proper tension and is reciprocated by means of a chain or flexible belt 43, one end of which is connected to the upper cross-head 41, as shown at 44 in Fig. 5, while the other end thereof is connected with the lower cross-head 23 by means of a bolt 45 which passes loosely through a boss 46 carried by the cross-head 23 and has a nut 47 screwed upon its upper end as shown in Fig. 7. 48 indicates a spring which is mounted on the bolt 45 between the boss 46 and the nut 47, a collar 49 preferably being interposed between said nut and the upper end of said spring. The intermediate portion of the belt 43 is supported by means of rollers 50, 51, 52, 53 and 54 arranged as shown in Fig. 1. The rollers 50, 51 and 52 are carried by the head 14 and move with it when it is adjusted by means of the adjusting screw 19. The roller 54 is mounted in the base 11 adjacent to the lower cross-head 23 and it is in the same vertical plane as the roller 50. The roller 53 is mounted at one end portion of a rocking arm 55 which is pivoted in the base 11 upon the pivot 56. The opposite end of said arm extends into the head 14 and is forked as shown at 57 to receive a pin 58 carried by said head. By this arrangement, when the head 14 is adjusted vertically it rocks the arm 55 and vertically adjusts the roller 53. As the belt 43 passes over said roller and under rollers 52 and 54 it will be evident that the roller 53 will be adjusted by vertical movement of the arm 14 to compensate for lengthening or shortening of the distance travelled by the chain incident to such adjustment of the head 14.

The spring 48 always maintains a certain tension on the chain 43 which may, however, be adjusted by means of the nut 47.

From the foregoing description it will be seen that by means of the chain 43 the saw blade 26 is held under constant tension which is not materially affected by the operation of the machine, since when the pitman 31 moves upward to carry the saw blade in the same direction it also moves the lower end of the chain 43 upward, thereby transmitting a corresponding upward pull to the cross-head 41 to which the upper end of the saw blade is attached. On the down stroke of the blade the chain 43 moves correspondingly in the opposite direction. The result is that the saw blade is kept under proper tension on its up stroke as well as on its down stroke, thereby making it operate more smoothly and avoiding danger of buckling the saw.

Figure 2:
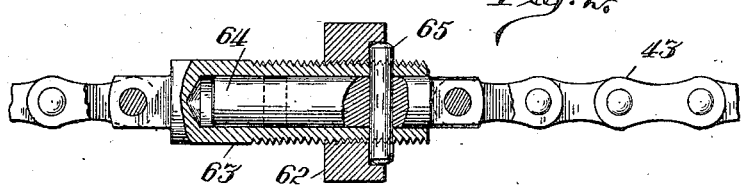
Fig. 2 is an enlarged detail, being a partial sectional view on line 2—2 of Fig. 1, illustrating a part of the driving chain or belt.

When a saw blade is to be removed or replaced it is necessary to relax the tension on the upper portion of the chain 43 until that work is accomplished, and in my improved machine this may be accomplished either by hand or by foot power. At the upper part of Fig. 1 I have illustrated a hand lever 59 for this purpose, said lever being mounted on a fulcrum 60 and being provided with a finger 61 which is adapted, by the swinging of said lever in the proper direction, to engage a block 62 carried by the chain 43, as best shown in Figs. 1 and 2. This block is mounted on a screw-threaded tubular bolt 63 which is connected to one of the links and receives a rod 64 telescoped therein and adapted to be held against longitudinal movement by a cross-pin 65 which passes through said rod and through suitable holes provided for that purpose in the bolt 63. The block 62 is preferably provided with a recess in one of its faces to receive the cross-pin 65, as shown in Fig. 2, thereby locking said cross-pin in position. The length of the connection formed by the rod 64 and bolt 63 may be varied by providing the rod 64 with a plurality of holes arranged to receive the pin 65 as indicated by dotted lines in said figure. From an inspection of Fig. 1 it will be seen that by swinging the lever 59 to the right the finger 61 may be caused to engage the block 62 and exert a pull in the same direction upon the chain 43 against the tension of the spring 48, thereby allowing the hook 40 to be moved toward the opposite hook 24 sufficiently to permit a saw blade to be put in place or removed. When this operation is performed the hook 24 does not move downwardly under the strain owing to the frictional resistance of the motor. While I prefer to equip the chain 43 with a connection such as that shown in Fig. 2, my invention contemplates the use of any other suitable means by which the lever 59 may be caused to engage and operate the chain 43 in the manner described. In order that this work may be done by foot power if desired, I also provide a foot lever 66 which is fulcrumed at 67 on the base 11, and is connected by a rod 68 with a lever 69 fulcrumed at 70 on the upper portion of the base, as shown in Fig. 1. The opposite end of the lever 69 is connected by a flexible connection 71 running over a pulley 72 with an arm 73 carried by the lever 59 or fulcrumed on the pivot 60. By this means when the foot lever 66 is depressed the finger 61 will be actuated in the manner already described to move the upper portion of the chain 43 to the right and move the hook 40 down into position for releasing the saw blade 26 already in place, or to receive a fresh blade.

If the saw blade should break while the machine is in use it is desirable that the operating mechanism be stopped automatically, and to this end I provide a switch shown in Figures 1, 9 and 10 which controls the operating circuit of the motor 38, and which is arranged to be automatically opened to break such circuit if the saw blade should break or become disconnected. In the construction shown I employ for this purpose an ordinary knife blade switch 74 which is pivoted at 75 adjacent to an intermediate portion of the chain 43 and is provided with an arm 76 and a spring 77. One end of said spring is connected with the arm 76 and the other end with the frame 14 so that said spring tends to move the switch 74 out of operative engagement with coacting contacts 78, as best shown in Fig. 9. The switch 74 is held in position to close the motor circuit by a latch 79 which is mounted on a pivot 80 supported by the frame of the machine, and is provided with an arm 81 having a sleeve 82 which embraces the chain 43, preferably at a point where a coupling 83 such as that shown in Fig. 2 is provided. The chain and coupling move freely through the sleeve 82, but the sleeve 82 is adapted to be engaged by a block 84 carried by said coupling if the chain should move down beyond its normal range of movement. The spring 48 shown in Fig. 7 tends to pull downward on the portion of the chain adjacent to the latch 79, and, therefore, if the saw blade should break or become disconnected said spring will move the intermediate portion of the chain 43 down far enough to cause the block 84 to engage the arm 81 of the lever 79 and move it downward far enough to release the switch 74 from said latch. The spring 77 will thereupon open the switch and stop the motor 38. The switch may also be opened by hand by simply lifting the latch 79 out of operative position.

As will be clear from the foregoing description, when the saw blade is in place it forms with the chain 43 an endless belt which moves back and forth over the supporting pulleys, during which operation the tension on the saw blade is maintained practically uniform at all times, as it makes the operation of the machine much smoother and better and minimizes the danger of breaking the saw.

What I claim as my invention and desire to secure by Letters Patent, is—

1. A jig saw comprising a machine frame, a belt supported by said frame and adapted to be connected to the opposite ends of a saw blade, guides for the saw blade, a spring operating to hold said belt under tension and connected between the driving means and the adjacent end of the belt, and a lever for detachably engaging and moving one end portion of said belt in opposition to the tension of said spring.

2. A jig saw comprising a machine frame, a belt supported by said frame and adapted to be connected to the opposite ends of a saw blade, guides for the saw blade, a spring operating to hold said belt under tension and connected between the driving means and the adjacent end of the belt, and a lever having an arm movable into engagement with said belt for moving one end portion thereof against the tension of said spring.

3. A jig saw comprising a machine frame, a belt supported by said frame and adapted to be connected to the opposite ends of a saw blade, guides for the saw blade, a spring operating to hold said belt under tension and connected between the driving means and the adjacent end of the belt, and hand and foot levers for detachably engaging and moving one end portion of said belt in opposition to the tension of said spring.

4. A jig saw comprising a base, a head adjustably mounted on said base and having an arm extending over said base, a reciprocating cross-head mounted on the base and having means for the attachment thereto of one end of a saw blade, a guide block mounted on said arm in alinement with said cross-head, and having means for the attachment thereto of the other end of the saw blade, a belt connected with said cross-head and guide block, guides for said belt, and means for adjusting said belt to compensate for the adjustment of said adjustable head.

5. A jig saw comprising a base, a head adjustably mounted on said base and having an arm extending over said base, a reciprocating cross-head mounted on the base and having means for the attachment thereto of one end of a saw blade, a guide block mounted on said arm in alinement with said cross-head, and having means for the attachment thereto of the other end of the saw blade, a belt connected with said cross-head and guide block, guides for said belt, and compensating means operated by the adjustment of said adjustable head for correspondingly adjusting said belt.

6. A jig saw comprising a base, a head adjustably mounted on said base and having an arm extending over said base, a reciprocating cross-head mounted on the base and having means for the attachment thereto of one end of a saw blade, a guide block mounted on said arm in alinement with said cross-head, and having means for the attachment thereto of the other end of the saw blade, a belt connected with said cross-head and guide block, guides for said belt, a lever mounted on the base, a guide for said belt mounted on said lever, and means operated by the adjustment of said adjustable head for rocking said lever to make compensating adjustment of said belt.

7. A jig saw comprising a machine frame, a belt supported by said frame and adapted to be connected with the opposite ends of a saw blade, power driven means for reciprocating said belt, and means for automatically stopping said power driven means if the saw blade should break or become disconnected, said last-named means comprising a latch pivotally connected with a fixed support and a tripping device for said latch secured upon said belt.

8. A jig saw comprising a machine frame, a belt supported by said frame and adapted to be connected with the opposite ends of a saw blade, power driven means for reciprocating said belt, and means for automatically stopping said power driven means if the saw blade should break or become disconnected, said last-named means comprising a latch pivotally connected with a fixed support and a tripping device for said latch adjustably secured upon said belt.

9. A jig saw comprising a machine frame, a belt supported by said frame and adapted to be connected with the opposite ends of a saw blade, means for maintaining said belt constantly under tension, power driven means for reciprocating said belt, and means for stopping said power driven means if the saw blade should break or become disconnected, said last-named means comprising a latch pivotally connected with a fixed support and a tripping device for said lever secured upon said belt.

10. In a jig saw, the combination of a frame, a belt supported thereby and adapted to be connected to the opposite ends of a saw blade, guides for the saw blade, power-driven means for reciprocating the saw blade, a latch pivotally connected with a fixed support and having an opening in one end through which said belt freely reciprocates, power-controlling means normally held in engagement with the other end of the latch, and an abutment carried by said belt and adapted to contact and turn said latch for disengaging it from said power-controlling means for stopping the operation of the machine if the saw blade should break or become disconnected.

11. In a jig saw, the combination of a frame, a belt supported thereby and adapted to be connected to the opposite ends of a saw blade, guides for the saw blade, power-driven means for reciprocating the saw blade, a coupling member secured to said belt, an abutment adjustably mounted on said coupling, a latch pivotally connected with a fixed support and having an opening in one end through which the belt and the said coupling thereon may reciprocate, and power-controlling means normally held in engagement with the other end of the latch, said latch being adapted to be turned to break its engagement with said last-named means when the abutment is caused to come in contact with the latch by the breaking or disconnection of the saw.

12. A jig saw comprising a machine frame, a belt supported by said frame and adapted to be connected with the opposite ends of a saw blade, a spring for maintaining said belt constantly under tension, power driven means for reciprocating said belt, and means actuated by said spring for stopping said power driven means if the saw blade should break or become disconnected.

13. A jig saw comprising a machine frame, a belt supported by said frame and adapted to be connected with the opposite ends of a saw blade, a spring for maintaining said belt under constant tension, a motor, means driven by said motor for reciprocating said belt, a switch for controlling the operation of said motor, and means actuated by said spring upon the breaking of a saw blade or the disconnection thereof, for operating said switch to stop the motor.

WILLIAM A. FIELD.